P. C. P. L. PREFONTAINE.
STORING HYDROCARBON LIQUIDS AND OTHER MATERIALS.
No. 56,508. Patented July 17, 1866.
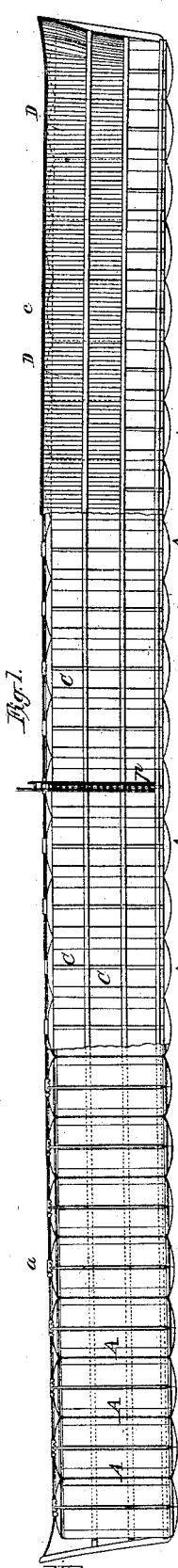
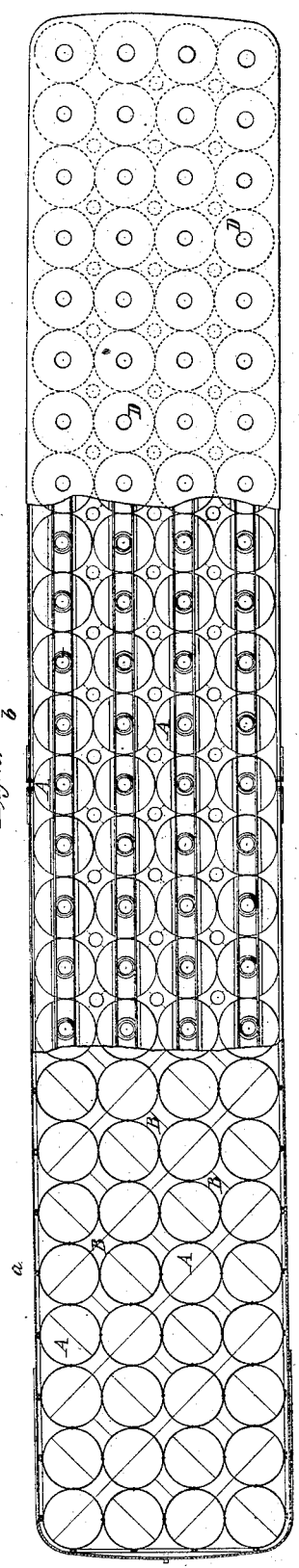
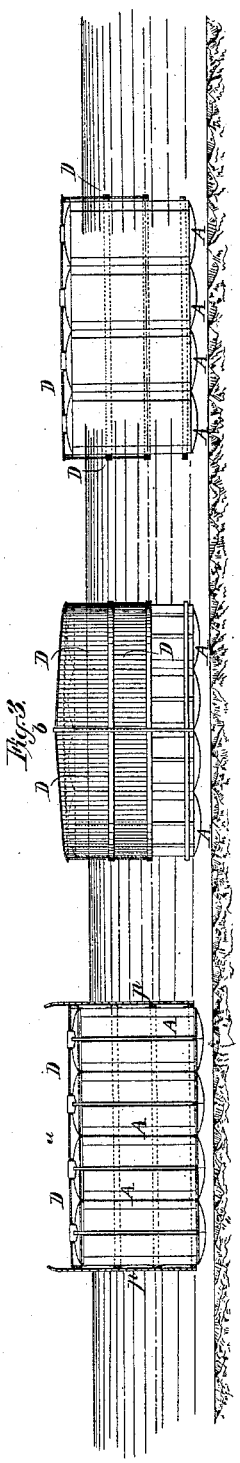
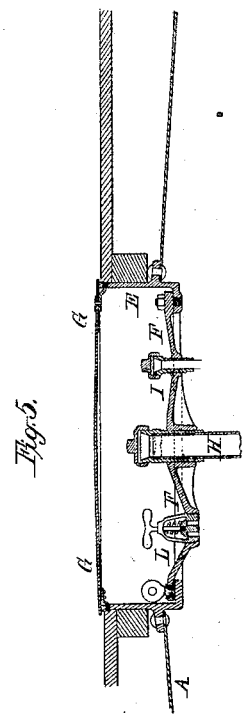
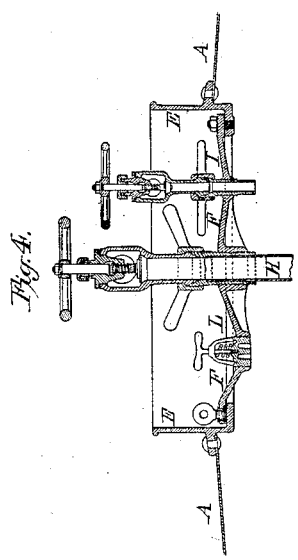

UNITED STATES PATENT OFFICE.

P. C. P. L. PREFONTAINE, OF PARIS, FRANCE.

IMPROVEMENT IN STORING HYDROCARBON LIQUIDS AND OTHER MATERIALS.

Specification forming part of Letters Patent No. 56,508, dated July 17, 1866.

*To all whom it may concern:*

Be it known that I, P. C. P. L. PREFONTAINE, of Paris, in the Empire of France, have invented certain new and useful Improvements in Warehousing Hydrocarbon Liquids and other Goods; and I hereby declare the following to be a full, clear, and exact description of the same, reference being had to the accompanying drawings.

My invention has for its object a system of warehousing peculiarly adapted for the storage of liquids, more especially hydrocarbon liquids, either volatile or fixed, but which may be employed in storing other goods of any nature whatsoever.

This system or mode of warehousing consists in storing the goods in vessels or receptacles constructed as hereinafter explained, which vessels are placed or immersed in water. The water in which they are thus placed may be either fresh or salt, and their immersion may be either partial or entire—that is, they may not be so immersed or submerged as to prevent them from floating, or they may be so deeply sunk as to rest on the bottom of the stream or body of water in which they are placed. They also may be constructed of any proper materials and of any desired dimensions, form, or shape. When used for warehousing liquids they may be filled or emptied by any of the means now employed for like purposes, and especially by the agency of either rarefied or compressed gases.

The principal advantages which result from this system of warehousing by immersion are the comparative fixity and equability of temperature of the medium in which the warehouse is located or placed, the security of said warehouse against all risks from fire, as it is surrounded on every side by water, in which, if need be, it may be completely immersed, and the ease with which it may be moved, enabling it to be removed from any neighboring danger, and also facilitating the transportation of goods from one point to another.

To enable others to make and use my invention, I will now proceed to describe the method of carrying the same into effect, as represented in the drawings.

Figure 1 is a longitudinal elevation of a warehouse constructed in accordance with my invention, and Fig. 2 is a plan view of the same at different elevations.

As shown in the drawings, the floating warehouse is composed of one hundred vessels or receptacles, A, brought together and arranged in four rows or series, each series being composed of twenty-five vessels. These vessels A are cylindrical, their ends being of a spheroidal shape, as seen in the sectional part *a* of Figs. 2 and 3, and are made of sheet-iron, strengthened and supported by braces of cast-iron or brass. They are so placed in relation to each other that the connection between them shall be as close and continuous as possible, so that, if desired, the spaces B between them may be also used.

The vessels are held together and firmly inclosed by the bands or hoops C, (seen in the sectional part *b* of Figs. 1 and 2,) which also serve as a frame-work for the planking or wooden sheathing D. (Shown in the sectional part *c* of Figs. 1 and 2.) This planking is used as a means of isolating and protecting the vessels as far as possible from atmospheric influences, and at the same time it serves in some sort as a bridge or platform by which access to the vessels is afforded, as shown in the sectional part *c*, Fig. 2, which shows the horizontal portion of the planking over the top of the vessels. The vertical portion of the planking, or that part of it around the sides of the warehouse, may extend to the bottom of the vessels, or it may only cover such portion of the sides as are exposed or above the water-edge.

Fig. 3 represents at *a* a vertical section through the axis of the vessels, at *b* an end elevation with the planking attached, and at *c* an end elevation with the packing removed.

The whole structure, comprising both the metal vessels and wooden frame-work and planking, is covered with the coatings needed, in order to preserve the wood and the metal. Each warehouse thus constructed may be covered and sheltered by a roof, or, as before said, may be sunk so as to rest on the bottom, or may be so arranged as to float in the water.

These warehouses are especially fitted for the storage of hydrocarbon fluids of every kind, and to this end the vessels are hermetically sealed.

In the drawings is represented a view of the opening or neck formed in the top of each of the vessels of which the storehouse may be formed, and shows one method of sealing or hermetically closing an immersed vessel.

The neck or opening is composed of the cup or basin E, Fig. 4, with a movable bottom, F. It is closed on top by a cover, G, and is secured to the top of the vessel A by means of the flange around its periphery. Fig. 4 is a view of this neck with the cup or basin in use. Fig. 5 represents the same when the basin is not used.

If the movable bottom F of the basin E be removed, a man-hole is formed, through which access may be had to the interior of the vessel. If, on the other hand, this movable bottom be secured in its seat in the basin E, the vessel is thereby hermetically sealed.

In the center of the movable bottom F is a tube, H, which extends downward nearly to the bottom of the vessel A. Through this tube pass all the liquids which are filled into or drawn out of the vessel A. On the right of the tube H, at the highest point on the movable bottom F, which, as shown in the drawings, slopes from right to left, is the smaller tube I, which affords an egress for the air driven out of the vessel by the liquid which is forced in, or which, when put in communication with a source of compressed air, allows that air to pass in, by which the liquid in the vessel is driven out through the central tube, H. On the left of the central tube, at the lowest point of the movable bottom F, is placed a valve, L, which regulates the compression of air in the vessel A, which may be worked by the hand either to regulate the pressure in the vessel or to enable the liquid in the cup E to re-enter the vessel A.

Having thus described my invention and the manner in which the same is or may be carried into effect, what I claim as my invention, and desire to secure by Letters Patent, is—

The system of warehousing, as herein described, by immersing in water any number of vessels or receptacles, of any form or dimensions, hermetically sealed and joined together, arranged in combined or separate series, strengthened and held together as herein described, and covered either by a roof or by planking on the top and around the sides, as described, the said system being adapted and fitted for the warehousing of all liquids and other substances.

In testimony whereof I have signed my name to this specification before two subscribing witnesses.

P. C. P. L. PREFONTAINE.

Witnesses:
 CH. ARMENGAUD,
 A. RICORDEAU.